United States Patent [19]

Grandury

[11] 3,985,254

[45] Oct. 12, 1976

[54] SYSTEM AND METHOD FOR LOADING AND UNLOADING A STORAGE APPARATUS FROM A VEHICLE

[75] Inventor: Yves Grandury, La Celle Saint Cloud, France

[73] Assignee: Societe Mobiliere Industrielle, Paris, France

[22] Filed: July 15, 1974

[21] Appl. No.: 488,820

[30] Foreign Application Priority Data

July 25, 1973  France .............................. 73.27249
Jan. 14, 1974  France .............................. 74.01163

[52] U.S. Cl. ................................. 214/515; 52/143; 52/194; 214/152
[51] Int. Cl.² .......................................... B60P 1/64
[58] Field of Search ............... 214/2, 501, 508, 515, 214/152; 52/122, 143, 194, 197

[56] References Cited
UNITED STATES PATENTS

2,606,676  8/1952  Dempster............................ 214/515

*Primary Examiner*—Robert G. Sheridan
*Attorney, Agent, or Firm*—Eric P. Schellin

[57] ABSTRACT

A method for loading on a vehicle provided with a pivotable handling arm or for unloading from the vehicle, a storage apparatus, such as a silo or tank, which may be inclined between an operative position in which a reference plane of the apparatus is roughly vertical and in which the apparatus may have its own stability on the ground, and a transport position in which the apparatus rests on the vehicle. The apparatus includes front support means which bear on the ground in said operative position and which are withdrawn for loading the apparatus, so that the apparatus is then, under the effect of the force of gravity, able to bear on the end of the handling arm and is free to be inclined toward the vehicle under the action of the handling arm, while retaining, for an angle of inclination to the vertical of said reference plane less than a limit value α, a supporting contact with the ground fixed support means. The apparatus is, for an angle of inclination exceeding α, either raised from the ground in a position in which the lower part of the apparatus is supported on the rear part of the vehicle or completely supported on the top of the vehicle in the loaded and transport position.

48 Claims, 17 Drawing Figures

SYSTEM AND METHOD FOR LOADING AND UNLOADING A STORAGE APPARATUS FROM A VEHICLE

It is known that the loose transport of granular or powdered materials occurs usually in vehicles having one or more hoppers which are discharged by gravity or pneumatically.

Vehicles are also known comprising a hopper tippable about an axis located adjacent the rear of the vehicle by cylinder devices, and which are consequently the combination of a hopper and a chassis of the bucket type.

All these vehicles require in their use fixed discharging and storage installations. Moreover, their design and construction are usually very complex since a vehicle is of necessity of small height with respect to its length, which is most disadvantageous for discharging or unloading powdered products.

An object of the invention is to provide a structure which is more rational that known structures for the storage and the loose transport of granular or powdered products.

According to the invention there is provided a method for loading on a vehicle provided with a pivotable handling arm or for unloading from the vehicle, a storage apparatus, such as a silo or tank, which may be inclined between a working position where a reference plane of the apparatus is roughly vertical and in which the apparatus may have its own stability on the ground, and a transport position in which the apparatus rests on the vehicle, wherein the apparatus includes front support means supported on the ground which, in the extreme position in which said reference plane is vertical and for charging are withdrawn, so that the apparatus is then, under the effect of the force of gravity bearing on the end of the handling arm and is free to be inclined toward the vehicle under the action of the handling arm, while retaining, for an angle of inclination to the vertical of said reference plane less than a limit value $\alpha$, a supporting contact with the ground through fixed support means, the apparatus being, for an angle of inclination exceeding $\alpha$, either raised from the ground in a position in which the lower part of the apparatus is supported on the rear part of the vehicle or completely supported on the top of the vehicle in the loaded and transport position.

Owing to the fact that the silo or other storage apparatus may be loaded onto a road vehicle or unloaded from the vehicle by the use of means provided exclusively on the vehicle itself or on the silo, it is possible to store the materials in any place where one or more silos are available and to directly transport the contents of the silos to the point of utilization without fixed unloading means being necessary, or to convey the silos to a station for transporting over long distance by rail, the same facilities of unloading being present, in this case, after transfer onto a road vehicle equipped according to the invention instead of the final destination.

According to a preferred arrangement, the handling arm constitutes in itself a front telescopic cylinder device acting on the upper end of the storage apparatus. The cylinder device is mounted to pivot about a horizontal axis perpendicular to the direction of travel of the vehicle, located in the upper part of the vehicle chassis and more precisely near to the coupling axis when the carrying vehicle is a semi-trailer. With this arrangement, the forces due to the cylinder device are transmitted, on one hand, directly to the tractor vehicle through the coupling saddle without introducing stress in the semi-trailer and, on the other hand, at a single fixed point of the apparatus.

The storage apparatus is equipped, at the lower end thereof which is opposed to that engaged by the cylinder device, with a support framework for support on the ground, the foot of which framework leaves during transport a normal ground clearance. This foot comprises two shoes which are folded toward the middle during transport so as to satisfy the authorized maximum overall width, and folded outwardly before unloading so as to increase the lateral stability. When unloading, the storage apparatus, at the start of the action of the cylinder device and so long as the angle of inclination exceeds $\alpha$, pivots about an axis located toward the rear of the chassis of the vehicle. The shoes of the foot come in contact with the ground at the moment when the angle $\alpha$ is reached then the rear axis of the storage apparatus is raised from its housing on the vehicle. Two chains, or two articulated rods, connect the foot to the rear of the vehicle to avoid any skidding of the shoes on the ground. If it concerns a silo, in the position of transport, the hopper is toward the rear. The raising of the silo is continued until the hopper has slightly passed beyond its normal discharging position, which permits putting the front support means in position.

These front support means are constituted by two lateral booms each of which is connected to the body of the storage apparatus by a ball and socket joint provided at the top of the boom and by a strut which, for the position of utilization of the apparatus, has a bracing function. This ball joint and a pivoting end of this strut define a pivot axis which is also the axis of a cone of revolution whose generatrices correspond to the path described by the boom during loading or unloading. During transport this axis is horizontal, the boom being disposed longitudinally under the apparatus and bearing on the chassis of the vehicle.

When the apparatus is raised, the booms, free to pivot about their pivot axis, each describe with respect to the apparatus a portion of a cone of revolution while remaining in contact with telescopic supports of teh vehicle which are previously extended. The cones of revolution are tangent to the vertical planes passing through the front booms before raising. At the end of the raising, the foot ends of the booms are therefore spread apart. The telescopic supports are then retracted and the booms, by their own weight, place themselves in the vertical planes containing their pivot axis.

The booms are supported on the ground through two shoes which are interconnected by a chain or cable. These shoes are placed in position symmetrically with respect to the longitudinal axis of the vehicle, the chain or cable being under tension. References or indices on the chain and the vehicle enable the positioning in the longitudinal and transverse directions to be effected with precision.

Then the booms are displaced forwardly and their ends are made to bear against a conical centering part of the shoe. This operation is possible since the end of the strut can move in a slot which allows lateral play to the booms. Then the cylinder device is retracted slightly and the booms bear on their shoes to which they are locked by means of a pin. The geometry of the assembly is so arranged that in this position, on flat ground, the end of the strut is located in the middle of the slot. The booms then work under pure compression.

On the other hand, if the ground is not perfectly planar, one of the booms encounters and is supported by the ground through its shoe before the other boom and the upper part of the apparatus rotates about the shoe which twists the rear framework until the second boom bears on its shoe. The length of the slot is such that at this moment the strut is not yet in abutment and the booms can then work under pure compression. Moreover, the rear framework is arranged with a very slight inertia of torsion so as to avoid large parasitic forces on the apparatus and allow an equal distribution of the loads on the two front booms and the two rear shoes.

Lastly, the cylinder device is completely retracted and the vehicle is moved rearwardly slightly so as to lessen the tension temporarily imparted during unloading on the two chains or articulated rods which are then detached from the rear feet of the apparatus and folded on the rear part of the vehicle. The vehicle can move off and the apparatus is in the erected position of use.

In the case of high lateral wind and if the storage apparatus is empty, stability is ensured since the booms cannot fold. Indeed, the strut integral with the boom which is on the side opposed to the action of the wind comes rapidly into abutment with one end of the guide slot and then prevents any movement of the ball joint of the boom. Consequently, the boom acts as if it were embedded in the apparatus. As this phenomenon is only liable to occur if the apparatus is empty, the boom has a very low compressive load per unit area and can support the force introduced by the strut with no danger of buckling.

For picking up the storage apparatus on its site, the same movements are carried out in the reverse order. The rear of the vehicle is brought to a position which is centered as far as possible between the booms. The chains or articulated rods are placed between the vehicle and the foot of the support framework and the vehicle is advanced until the chains or articulated rods are under tension.

The telescopic cylinder device is then actuated and its rod engages in a guide and support member constituted by a truncated pyramid open downwardly from a nose portion extending the corresponding end of the apparatus. A centering is made possible owing to the flexibility of the cylinder device and the flexibility of the suspension of the vehicle. The cylinder device is arranged to be capable of operating while transmitting the moment due to any imperfection of the centering.

The operation is begun by slightly raising the apparatus by means of the cylinder device so as to permit the withdrawal of the front support means, that is to say, the removal of the shoes of the booms, and the latter are made to bear on the telescopic supports of the vehicle which have been extended.

The cylinder device is retracted and the apparatus descends. In approaching the vehicle, a centering member of the storage apparatus bears on one of two inclined planes of a guide provided on the vehicle. The framework foot is relieved and the centering member slides on the inclined plane until it is engaged between two vertical planes extending the inclined planes. The position of the storage apparatus is then such that its horizontal pivot axis is located just above the housing provided for it in the vehicle. As the cylinder device continues to retract, the spindle bears in its housing when the inclination assumes the angle $\alpha$ and the shoes of the foot raise off the ground. As the end of travel, the storage apparatus is in a horizontal supported position on the vehicle. The shoes of the foot are folded and the booms, after having described a conical movement, are applied on the bottom of the body of the apparatus. The telescopic supports of the booms are then retracted. The vehicle is ready to move off.

An appropriate mechanism permits connecting the apparatus to the storage vehicle at three points so as to ensure safety in transport.

The support framework comprises a ladder which allows, in the position of transport, access to the upper part in which are disposed the charging trap doors. In the discharging position, the same ladder allows access to a platform disposed in the framework from which it is possible to act, if it concerns a silo, on the controls for opening the hopper while supervising the emptying of the silo into the recipient previously brought into position under the hopper. If during certain periods the apparatus is inactive, that is to say it does not have a function independent of the vehicle, it may be employed with the road vehicle as a loading or unloading bucket, the support framework and the booms having been removed. It may also be employed independently of the road vehicle as a container when the support framework, the booms and the nose portion have been dismantled.

The invention will be understood from the ensuing description of two embodiments with reference to the accompanying drawings in which.

Figure 1:
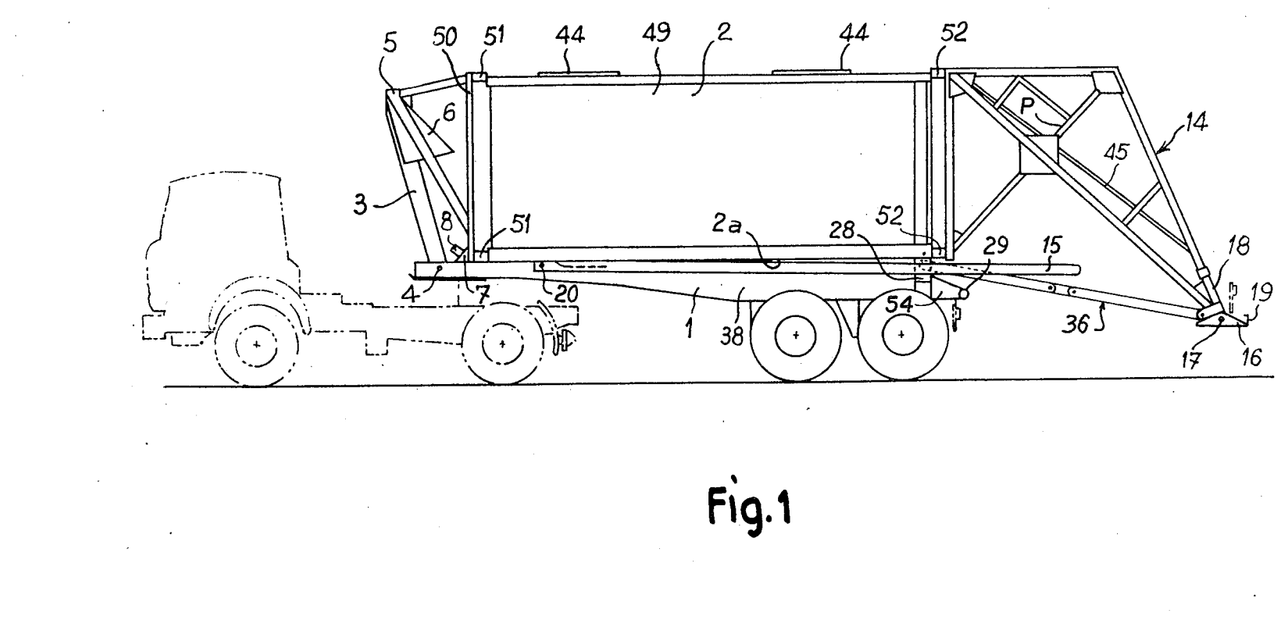
FIG. 1 is an elevational view of a road vehicle in the form of a tractor semi-trailer loaded with a silo type storage apparatus in the road or transport position.
Figure 2:
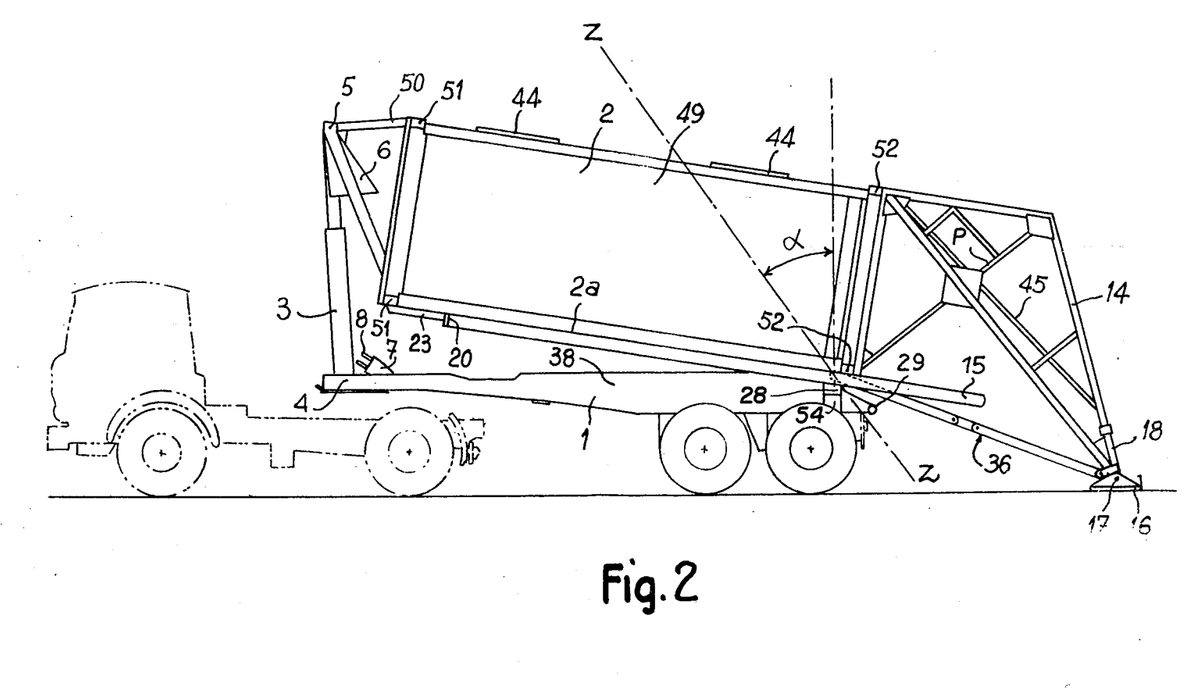
FIG. 2 is an elevational view of the same vehicle at the start of the actuation of the cylinder device when the foot of the support framework comes in contact with the ground.
Figures 6, 7, 8:
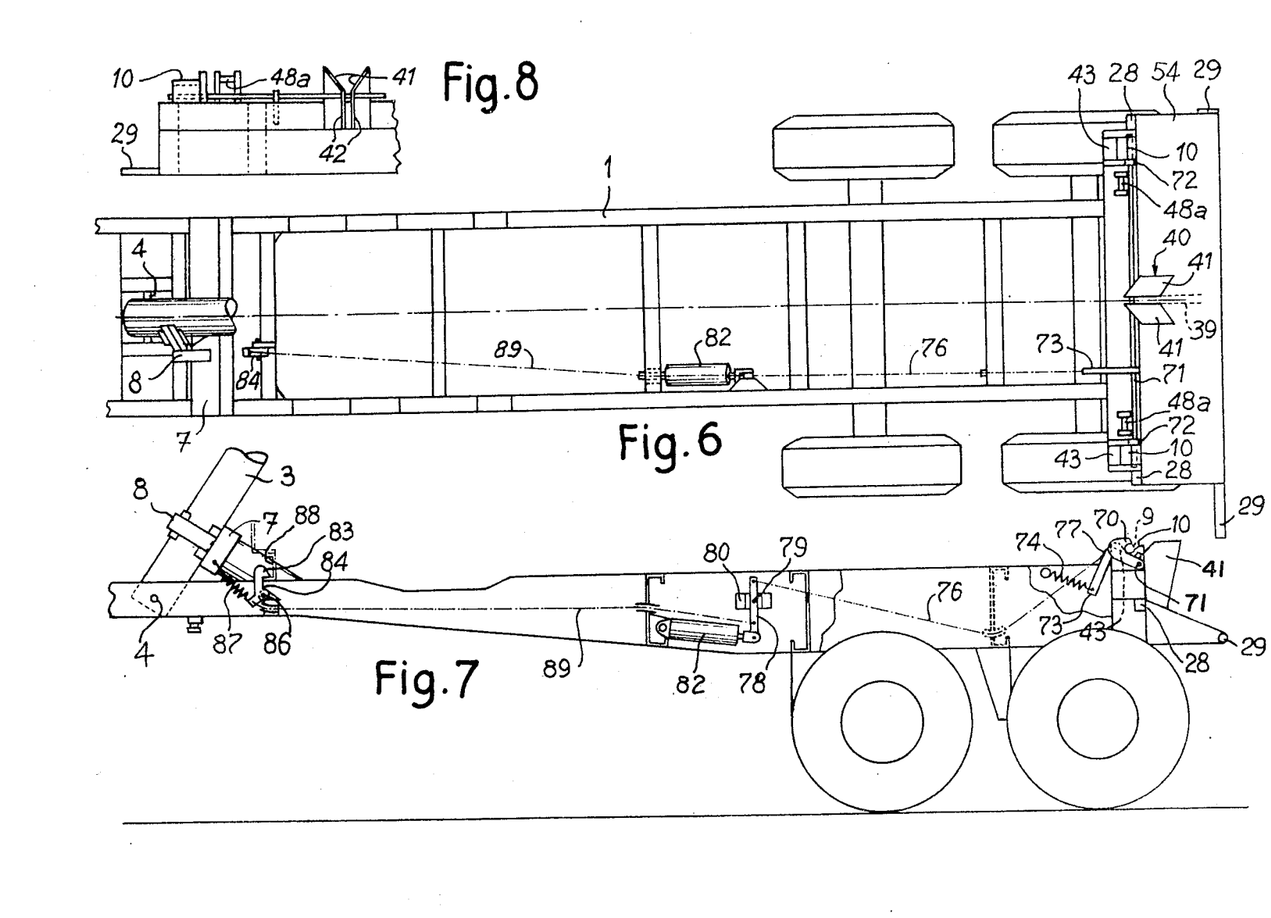
FIG. 6 is a plan view of the semi-trailer without the silo.
FIG. 7 is a corresponding elevational view.
FIG. 8 is a partial view of the rear end of the semi-trailer.

The silo 2 which is filled with a powdered material is shown in FIG. 1 in the transport position on the semi-trailer 1. For the purpose of discharging or unloading the silo 2, a telescopic cylinder device 3, mounted to pivot at one end about a pivot pin 4 located at the front end of the semi-trailer 1, has an extensible free end which cooperates with a nose portion 5 of triangulated construction, which extends the front end of the silo 2, through a guide and support member constituted by a portion of a truncated pyramid 6 which forms a pocket-like receptacle and permits the centering of the cylinder device 3. During transport of the silo 2, the cylinder device 3 is completely retracted. It cannot move since it is connected to the semi-trailer 1 by the pivot pin 4 and to the silo 2 by the nose portion 5. During the unloaded travel of the semi-trailer 1 (FIGS. 6 and 7), the cylinder device 2 is held against a cross-member 7 by a locking device 8.

Figure 9:
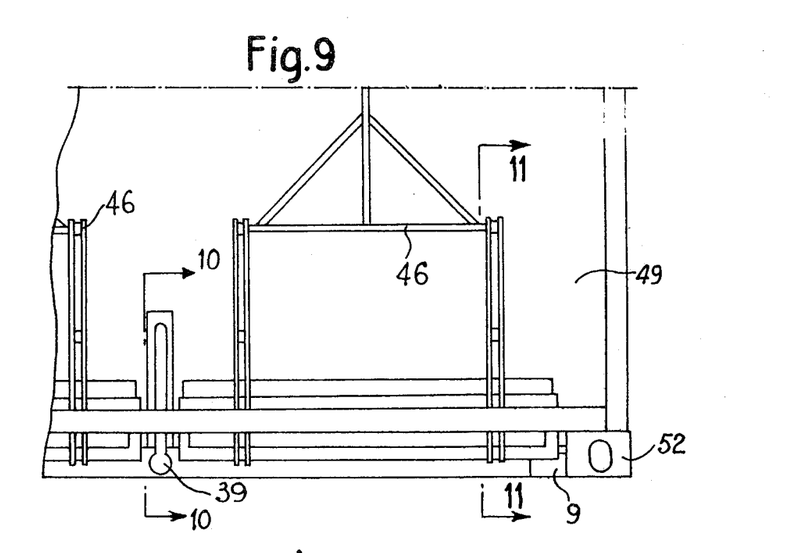
FIG. 9 is a partial elevational view of the rear side of the silo, the support framework having been dismantled.
Figure 10:
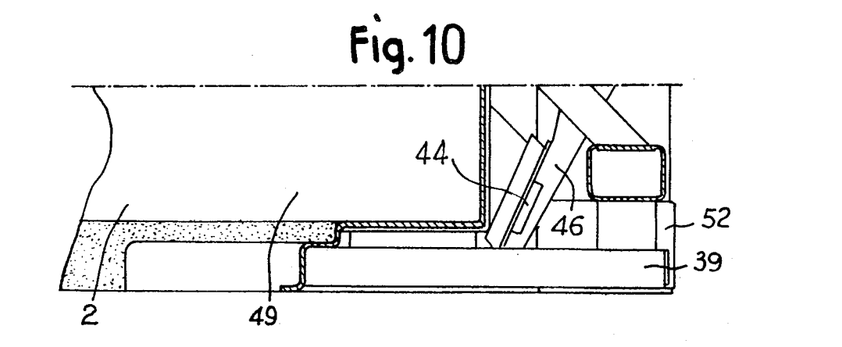
FIGS. 10 and 11 are sectional views taken on line 10—10 and line 11—11 of FIG. 9.
Figure 11:
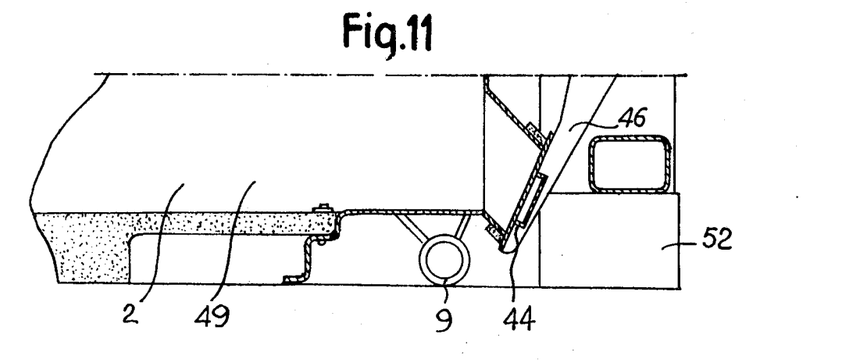

The silo 2 is pivoted to the semi-trailer 1 by two tubular transverse journals 9 integral with the lower and frame of silo 2 (FIGS. 9 and 11) which are separately engaged in two bearings 10 in the form of cradles integral with the semi-trailer 1. Each journal 9 may be retained in its bearings 10 by means of a locking hook 70 (FIG. 7) which is rendered integral with a transverse rod 71 pivoted to the rear of the semi-trailer by members 72. Secured to the rod 71 is one of the ends of a cranked control arm 73 whose other end is subjected to the action of a spring 74 which biases the rod into engagement with the respective journal so as to lock the latter and render the silo integral with the semi-trailer at the rear. The two hooks may be disengaged from their locking position in opposition to the action of the spring 74 by a cable 76 one of the ends of which is anchored at 77 to the corner of the control arm 73 and whose other end is fixed to the upper end of a lever 78 pivotably mounted at 79 on a member 80 of the semi-trailer and pivoted at its lower end to the rod of an actuating cylinder device 83. It will be clear that the extension travel of the cylinder device 82 unlocks the journals 9.

In order that the front of the silo may also be rendered integral with the semi-trailer, a locking fork 83 formed at one of the ends of a cranked lever 84 pivotably mounted at 86 on the semi-trailer is urged by a spring 87 to come into engagement with the edge of a notch 88 provided in the front of the silo but may be disengaged from its locked position by a cable 89 fixed at its respective ends to the cranked lever 84 and to the lever 78 at a point intermediate the pivot 79 and the rod of the cylinder device 82 whose extension travel unlocks the front hook jointly with the two rear hooks.

Figure 5:
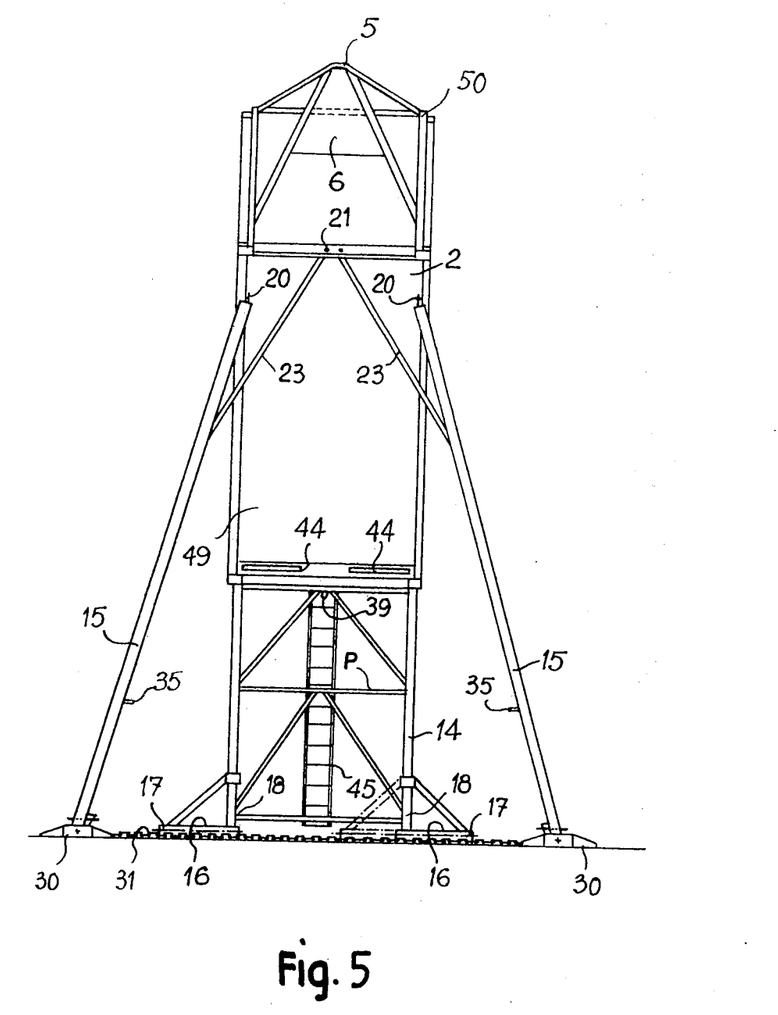
FIG. 5 is a front elevational view of a silo in the position of use, the articulated rods having been disassembled.

The means for supporting the silo 2 on the ground in the unloaded position comprise a framework 14 of generally triangulated construction and two booms 15. The foot 14a of the framework 14 is combined with two shoes 16 mounted to pivot about horizontal pins 17. The assembly constituted by a shoe 16 and a pin 17 is pivotable through about 180° about the end part of one of the bars of the framework 14. When folded inwardly (FIG. 5), the shoes 16 may be locked with respect to the pins 17 and the end parts 18. They then constitute by their faces 19 regimentary bumpers which satisfy the maximum width required by the highway code. When the shoes 16 are folded outwardly, they may be locked with respect to the end part 18 without being locked to the pin 17 so as to be capable of serving as a support for the silo 2. In FIG. 5, the shoes 16 are shown in full line in the position of use for unloading and one thereof is shown in dot dash line in the road position.

The two booms 15 (FIGS. 12, 13, 14 and 15) are disposed horizontally and laterally under a plane face 2a (FIG. 1) of the silo 2 during transport, parallel to the axis of the vehicle. They are each mounted to pivot about an axis X—X embodied, on one hand, by a ball 20 of a ball joint, the ball being carried by the end of the boom 15 and the other part of the ball joint being connected to a plate 53 fixed to the plane face 2a in the vicinity of the front end of the silo 2, and, on the other hand, by a pin 21 pivotable in a rectilinear slot 22 which is perpendicular to the plane face 2a and formed in one of the flanges of an angle member 22a secured obliquely by its other flange of the plane face 2a at the front end 2b of the silo. The pin 21 forms a part of a cranked end portion of a strut 23 whose other end is fixed to the boom 15. The ball 20 has extending therethrough a shaft 24 having an axis X—X and journalled with large clearance in bearings 25 integral with the plate 53. In the unloaded position, the ball 20 bears on a spherical cup 27 of a tubular member 26 fixed to the plate 53 and oriented in the direction of the boom 15 for the unloaded position of utilization of the silo 2. During transport, the booms 15 bear against fixed brackets 28 (FIGS. 1, 6, 7) located toward the rear of the semi-trailer 1 which semi-trailer also has at its rear end telescopic support elements 29 (FIGS. 6 and 7) located a little lower than the brackets 28 and employed when raising or picking up the silo 2 to be described hereinafter. In the unloaded position, the booms 15 are supported by the ground through shoes 30 interconnected by a chain 31 (FIG. 15) The cavity or housing 32 receiving the boom 15 on the shoes 30 is surmounted by a guide member constituting a half-funnel 33 adjacent the chain 31.

The silo 2 is maintained axially with respect to the semi-trailer 1 during the handling of the silo 2 by two lateral ties 36 (FIG. 16) each comprising two rods 37 which are interconnected by a coupling 37a mounted to pivot about horizontal axes and are respectively connected in a permanent manner, during the utilization of the silo as a silo, to the rear of the semi-trailer by a universal joint and to the lower element 14a (FIGS. 3, 4) of the framework 14 in a separable manner by a simple pivotal joint 47 having a pivot axis parallel to the pivot axes of the coupling 37a. The universal joint comprises a member 48 pivotable on a horizontal pin 48a (FIGS. 8 and 16) of the semi-trailer and pivoted by a pin 48b, perpendicular to the pin 48a, to the corresponding end of the adjacent rod 37 of the tie 36. The ties 36 may thus be folded onto the rear of the semi-trailer during transport.

In order to ensure that the silo is held in position faultlessly the two pins 48a mounting the ties and the two bearings 10 receiving the journals 9 of the silo define a common geometric pivot axis. The silo 2 is centered with respect to the semi-trailer 1 during handling by a pin 39 (FIGS. 5, 6, 9 and 10) fixed to the silo 2 in the median plane of the latter cooperating with a centering device 40 located at the rear and on the axis of the semi-trailer 1. The device 40 comprises means defining two inclined planes 41 (FIG. 6) for centering and two vertical planes 42 for guiding spaced apart a distance corresponding to the diameter of the pin 39. In the case where the ties 36 would be sufficiently under tension, the bearings 10 have adjacent the front of the semi-trailer 1 means defining downwardly and rearwardly inclined planes 43 against which the journals 9 may bear.

The means for charging the silo 2 comprises two apertures closed by covers 44 which are accessible in the road position owing to the provision of a ladder 45 located in the framework 14. The silo-discharging discharging means comprise two devices 46 (FIGS. 9, 10, 11) constructed in accordance with the teaching of French Pat. No. 73 32744 filed on Sept. 12, 1973.

The control handles (not shown) are accessible from a platform P located in the framework 14. In the unloaded position of the silo 2 this platform P is horizontal. It is possible to stand thereon owing to the ladder 45. Two devices 46 are provided so as to make it possible to empty the silo 2 at will either into small recipients by employing a single device 46 or into large recipients by employing simultaneously two devices 46. This arrangement has the further advantage of allowing an easy anchorage of the pin 39 on the silo 2 between the two devices 46.

The silo 2 comprises essentially a rectangular-sided standard container 49 having charging means 44, discharging means 46, pivot means 9 and positioning means 39. Disposed on the container 49 are the following easily dimantled means:

in the front, a frame 50 supporting the nose portion 5 and fixed to the standard front-most corners 51;

at the rear, the framework 14 is fixed to the standard rear-most corners 52;

below, the booms 15 fixed by plates 53 supporting the members 26 and the bearings 25, and by the angle members 22a defining the slots 22. The plates 53 and the angle members 22a are screwed to the body of the container 49.

In the position of use (FIG. 4), the bisecting plane Z—Z of the lower dihedral of the container is vertical.

Figures 16, 17:
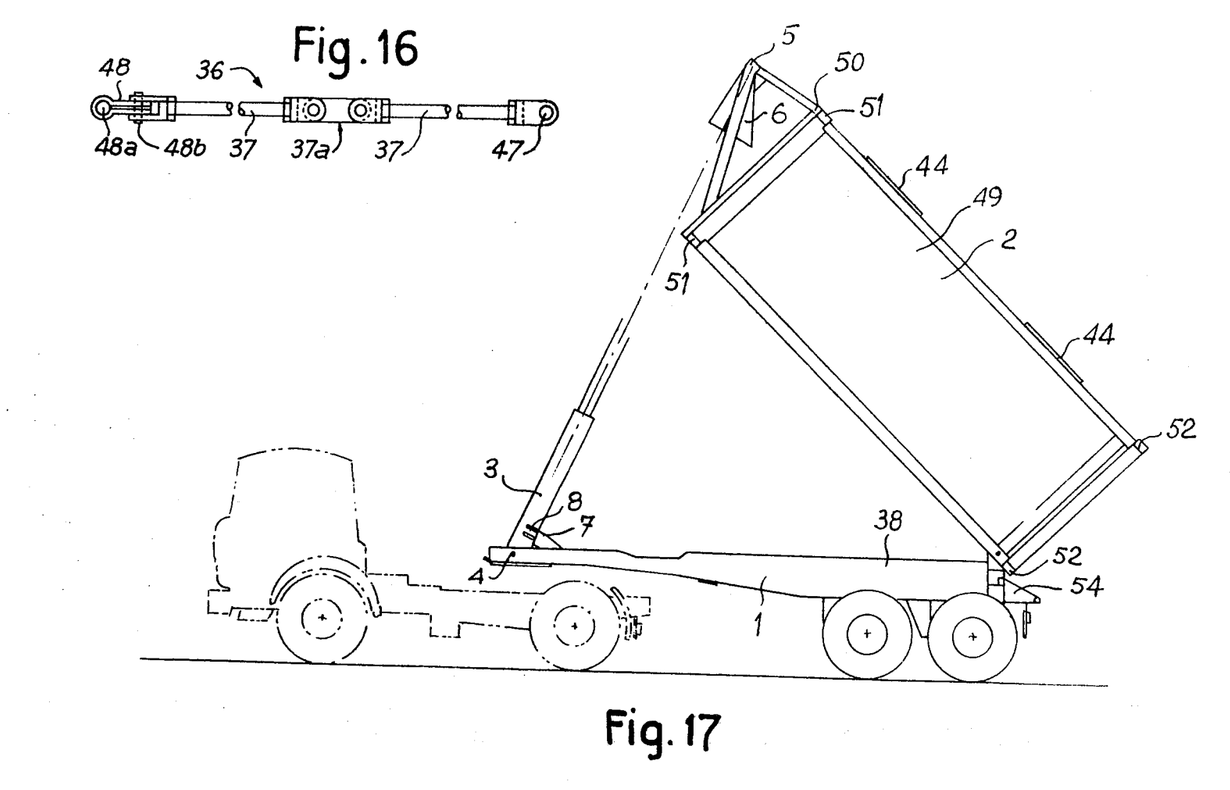
FIG. 16 is a view of one of the articulated rods connecting the silo to the semi-trailer.
FIG. 17 is an elevational view of a road vehicle comprising a tractor and semi-trailer employed as a tipping bucket, in the discharging position, the booms and the lower end support framework of the silo having been removed.

To permit a partial emptying in the road position of the silo 2 (for example, if there is an overload) and the total emptying when on the semi-trailer 1, the container 49, which is equipped only with the front bearing 50 (see FIG. 17), is employed as a tipping bucket, the semi-trailer 1 is equipped at the rear with a protecting sheet 54 constituting a pouring means. In FIG. 17, the container 49 is permanently pivotably mounted on the rear of the semi-trailer, the hooks 70 being maintained locked by a modifications of the assembly which renders inoperative the connection of the cable 76 to the cylinder device 82. Further, the ties 36 are removed from the semi-trailer.

Relative to FIGS. 1–16, in order to deliver the silo 2 and to pass from the transport position to the position of use, in which the silo may be discharged of its contents, the following operations are carried out:

With the vehicle as shown in FIG. 1, the cylinder device 82 is made to extend so as to unlock the front hook 83 and the two rear hooks 70, the shoes 16 are unlocked from the framework 14 and they are made to pivot outwardly through about 180° about the end part 18 to which they are once again locked. The telescopic support means 29 (FIGS. 1, 6 and 7) are drawn out or extended.

Figure 3:
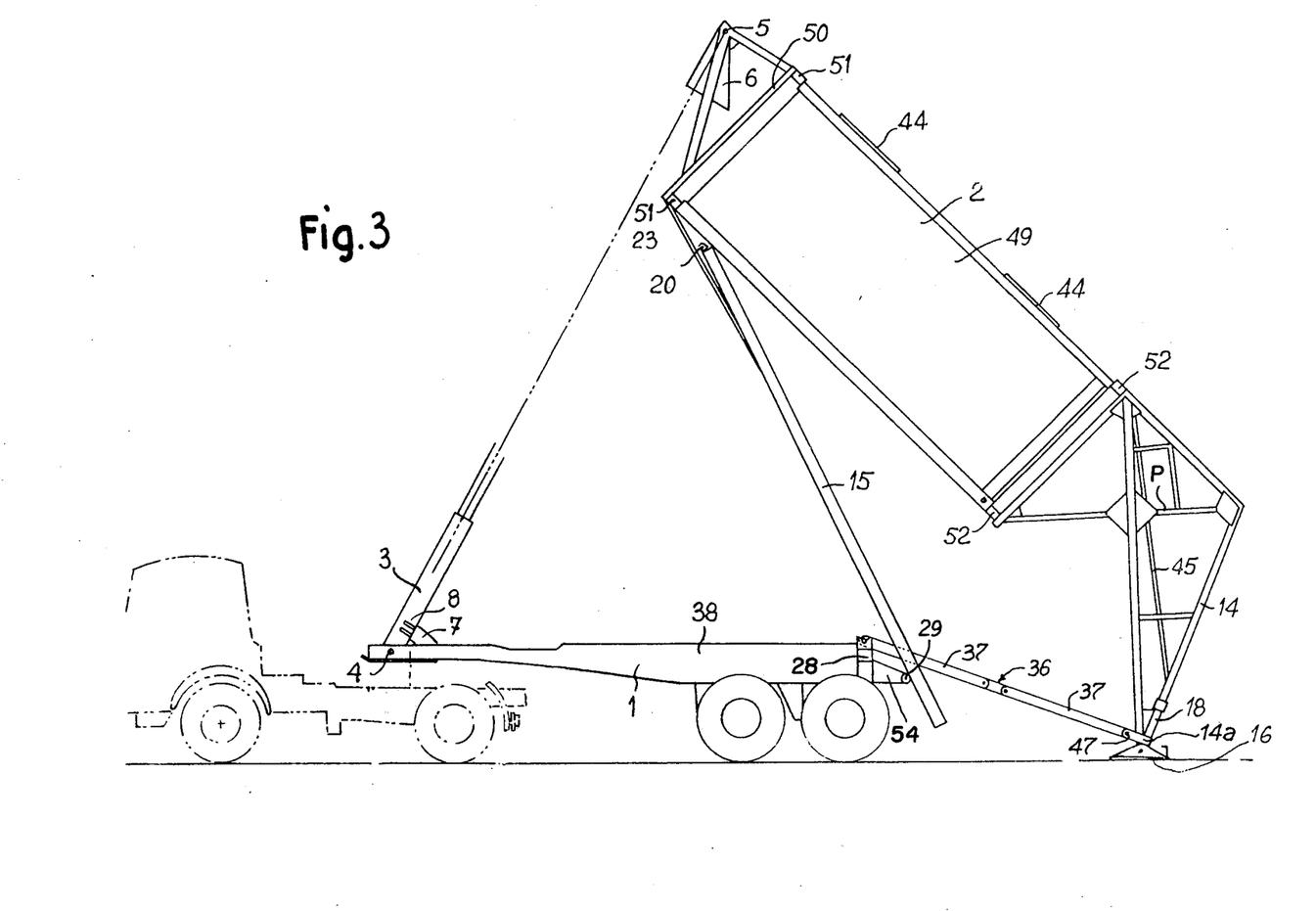
FIG. 3 is an elevational view of the same vehicle at the end of the actuation of the cylinder device, the booms being in bearing relation to telescopic supports of the semi-trailer.
Figure 4:
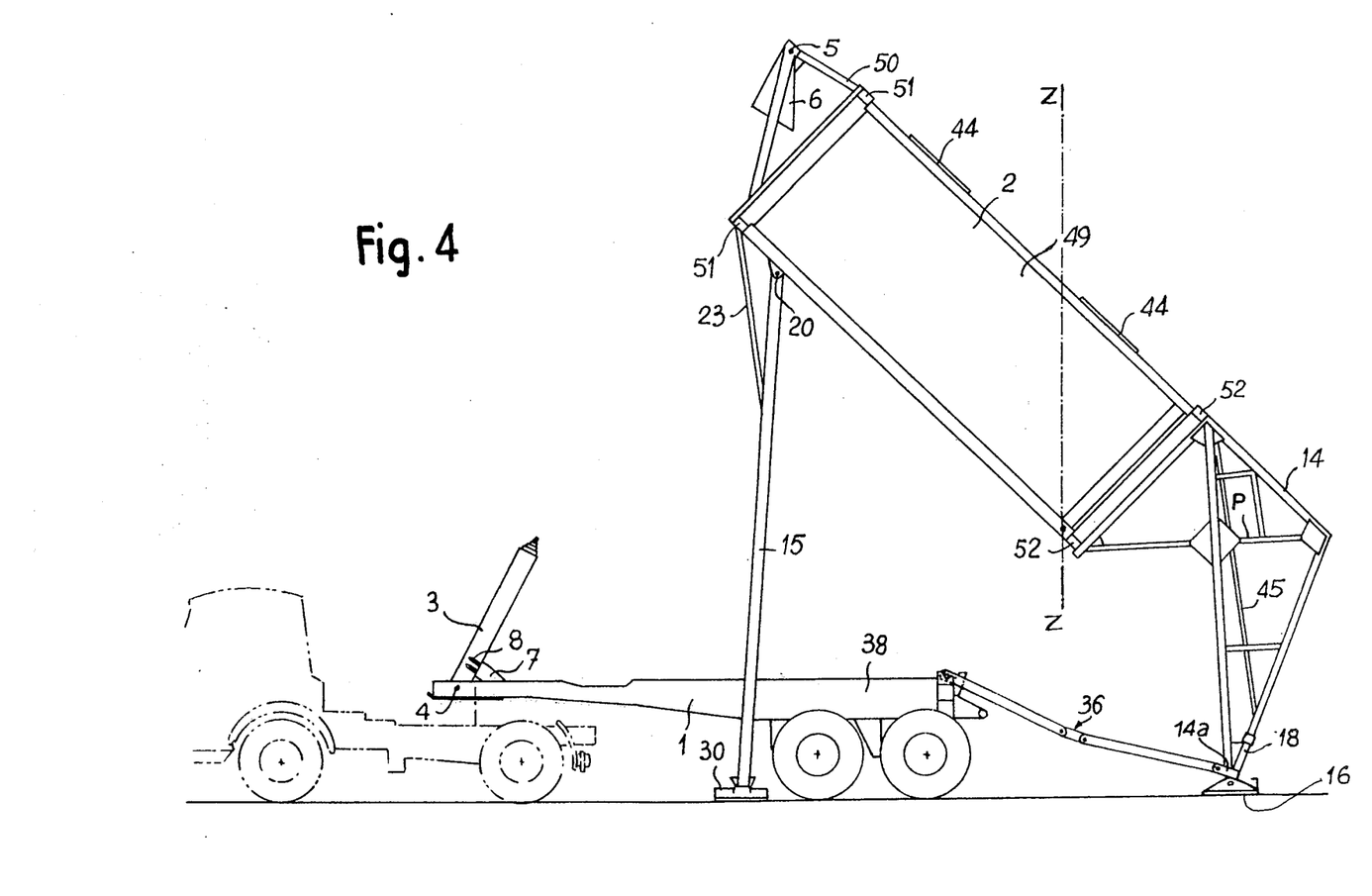
FIG. 4 is an elevational view of the same vehicle after having moved rearwardly slightly, the silo having its booms in the position of use, the articulated rods being slack.

In extending the telescopic cylinder 3, the silo 2, together with the ties 36 under tension, pivots about the journals 9 (FIGS. 7 and 11) engaged in the bearings 10. The shoes 16 come in contact with the ground, as shown in FIG. 3, for a position in which the bisector reference plane Z—Z makes an angle of $\alpha$ with the vertical and the journals 9 are raised off the bearings 10. Thenceforth, the action of the cylinder device 3 causes the silo to pivot about the pins 17 of the shoes 16 which causes the pivoting of the booms 15 about their axis X—X (FIG. 12) which slide very slightly outwardly on the brackets 28. Soon the booms 15 come in contact with the support means 29 and are disengaged from the brackets 28. At the end of travel of the cylinder device 3, the axis Z—Z has moved slightly beyond the vertical position and the ties 36 under tension prevent any relative movement of the silo 2 and the semi-trailer 1 which might be caused by the horizontal component of the force exerted by the cylinder device 3. The booms 15 have slid outwardly in a substantial manner on the support means 29 and beyond the road width.

Then the end of one of the booms 15 is raised slightly, the support means 29 are withdrawn and the boom 15 is allowed to descend and, under the effect of its own weight, places itself on the vertical plane of the axis X—X after having described a cone of revolution about this axis. In the course of this movement, the boom is carried by the bearings 25 and by the pin 21, constituting a pivot axis, in abutment with the uppermost point 22c of the slot 22.

The same operations are carried out with the other boom 15.

Figures 12, 13, 14, 15:
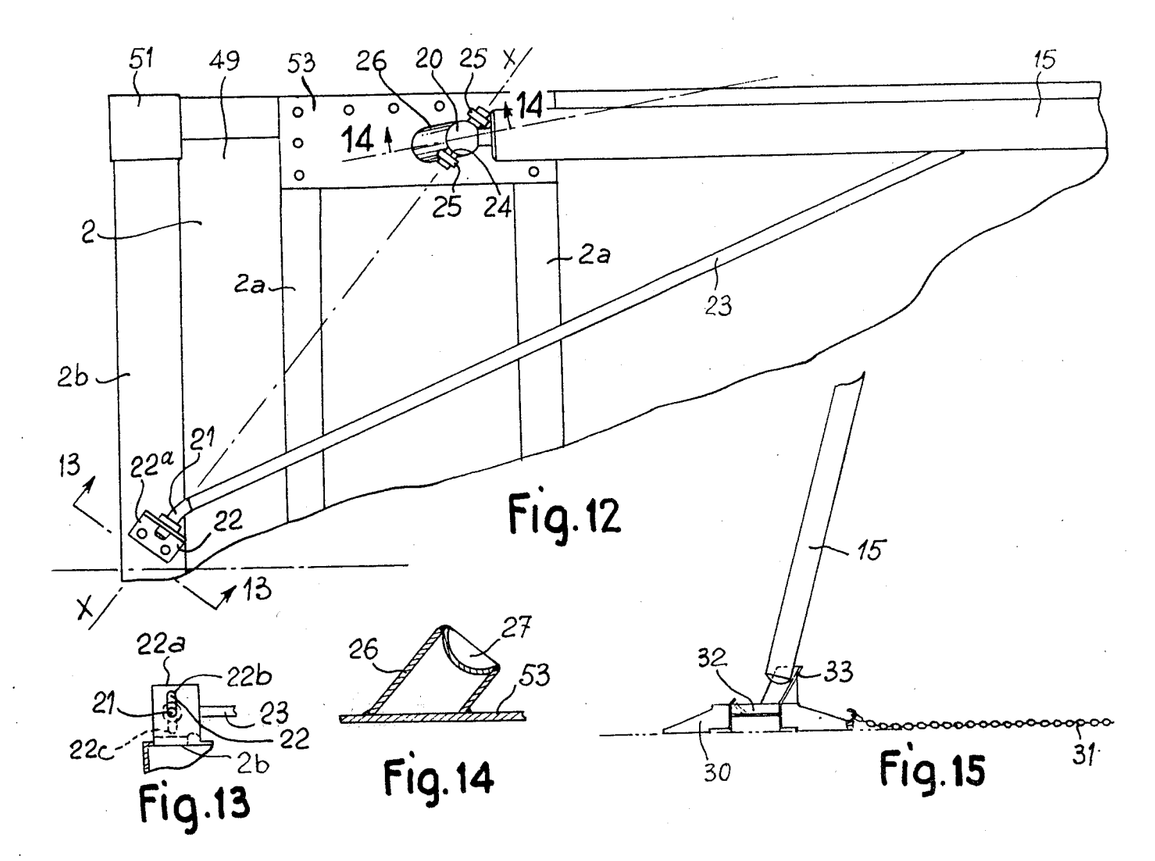
FIG. 12 is a partial bottom view of the silo in the region of the pivotal connection of a boom.
FIG. 13 is a sectional view taken on line 13—13 of FIG. 12.
FIG. 14 is a sectional view, to an enlarged scale, taken on line 14—14 of FIG. 12 showing the support member of the ball joint of the boom.
FIG. 15 is a sectional view of the boom shoe at the moment of the positioning of the boom on a generally funnel-shaped guide.

Owing to their own weight, the two booms 15 assume symmetrical positions, the pins 21 always being in abutment at the uppermost point 22c of the slots 22. The two shoes 30 are placed in position symmetrically relative to the longitudinal axis of the semi-trailer, so that the chain 31 is put under tension and a positioning reference disposed on the chain 31 is located vertically in alignment with a corresponding reference on the semi-trailer. The booms 15 are placed in position as shown in FIG. 15 by bringing them into engagement with the funnels 33. To do this, they must be shifted a little away from their normal path. When the booms 15 bear against the funnels 33 owing to the correct positioning of the shoes 30, the pins 21 are positioned substantially in the middle of the slot 22. Finally, the cylinder device 3 is slightly shortened; the booms 15 descend along the funnels 33 into their cavities 32, as shown in FIG. 15. The cylinder device 3 is disengaged from the nose portion 5 and slides on the truncated pyramid 6 until its body bears against the cross member 7; it separates from the pyramid 6 and is completely folded up, then it is held stationary by the locking device 8. The silo 2 then rests on the framework 14 and on the booms 15 whose ball 20 bears against the cup 27 and the booms are braced by the struts 23. A slight movement in reverse of the semi-trailer 1 (FIG. 4) permits disengaging the ties 36 from the elements 14a of the framework and rendering the silo 2 independent of the vehicle. The silo is ready to be emptied.

In order to pick up the silo 2 and pass from the position of use to the transport position, the following operations are carried out:

The vehicle is reversed between the booms 15 while endeavouring to achieve the most perfect centering possible, the ties 36 are deployed and the connecting pin 47 is placed in position between the ends of the corresponding rod 37 and the element 14a of the framework 14. The vehicle is moved forwards until the ties 36 are under tension.

The device 8 is unlocked and the cylinder device 3 is extended. The cross-member 7 is positioned in such manner that the cylinder device 3 is centered in the truncated pyramid 6 as it becomes erect and moves away from the cross-member 7. The lateral centering brings about the flexing of the cylinder device 3 and of the suspension of the vehicle. When the cylinder device 3 bears against the nose portion 5, the silo pivots about the pins 17 of the shoes 16 and the foot ends of the booms 15 disengage from the cavities 32 of the shoes 30.

The shoes 30 are then removed. One of the booms 15 is raised rearwardly and the corresponding telescopic support means are extended and the boom 15 is made to bear on this support means. The same operations are carried out for the other boom 15.

The cylinder device 3 is retracted or shortened so that the silo 2 pivots about the pins 17 until the pin 39 of the silo comes in contact with one of the planes 41 of the centering device 40. The plane 41 is then tangent to the pin 39. As the cylinder device 3 continues to shorten, the silo 2 bears against the semi-trailer 1 and this decreases the pressure on the ground exerted by the shoes 16. Due to the fact that, simultaneously, the pin 39 bears on the device 40 in the region of an inclined plane 41, a horizontal component results which tends to cause the shoes to skid until the pin 39 is engaged without clearance between the vertical planes 42, which ensures a perfect centering at the rear of the semi-trailer 1. Simultaneously, as soon as the shoes 16 slide on the ground the lateral force introduced by the cylinder device 3 on the nose portion 5, owing to the flexing of the cylinder device 3 and of the suspension of the vehicle, causes the silo 2 to rotate about a vertical axis passing through the device 40 which cancels out said lateral force and completes centering throughout the lenght. As the ties 36 are under tension, the journals 9 are presented strictly above the bearings 10; if not, they are located slightly in front of and above the inclined planes 43. In any case, with possibly a slight rearward skidding of the shoes 16, the journals 9 automatically position themselves. The silo is then inclined at the angle α.

During this first part of the shortening of the cylinder device 3 and so long as the shoes 16 are in contact with the ground, the booms 15 first slide, while describing a cone of revolution, on the telescopic support means 29 and move towards the vehicle until they reach the brackets 28. Then they slide still more, but very slightly, on the brackets 28 while remaining parallel to the lower face 2a of the container 49 as soon as the journals 9 bear on the bearings 10, that is, immediately before the shoes 16 rise and before the angle that the reference plane Z—Z makes with the vertical becomes greater than α.

The cylinder device 3 continues to shorten and the silo 2 pivots about the journals 9 on the bearings 10 and the container 49 bears against the semi-trailer 1 when the cylinder device 3 is completely retracted. The booms 15 are parallel to each other and perfectly positioned without clearance, since the elongated slots are vertical.

The shoes 16 are unlocked, pivoted through about 180° about the end part 18 and locked in the inner road position. The support means 29 are withdrawn and the cylinder device 3 is actuated in the direction for shortening it so as to put the three locking hooks 83, 70, 70 in their operative position under the effect of the springs 84 and 74.

The vehicle is ready to move off.

It will be observed that all the operations may be carried out by a single man, that is to say practically by the driver of the vehicle. There is no great effort required for this purpose since no detachable member is heavy and the booms are moved by hand only in the vicinity of their position of equilibrium owing in particular to the fact that fixed brackets 25 are provided for transport and telescopic support means 29 are utilized solely for positioning and picking up the silo 2.

Moreover, note with reference to FIG. 5 that when the silo is charged or full, owing to the effect of its own weight, the struts 23, whose end 21 is roughly in the middle of the corresponding slot 22, perform no function in the stability of the silo. On the other hand, when empty in the event of a blast of wind oriented laterally from right to left (FIG. 5), the pin 21 of the left strut 23 can come instantly into abutment with the upper end of the slot 22, owing to the rotation of the left boom 15 about its shoe 30, and create with the body of the silo a sealed effect which creates a moment opposing the tipping over torque, whereas without the struts, there would be produced a rotation about the rear foot which would cause the apparatus to fall over by a raising of the right boom, corresponding to a rotation about an axis by the two left shoes.

In the embodiment described hereinbefore, the hopper is formed by four sides of the container 49. The container is inclined at 45° for discharging so that the hopper has two vertical planes and two planes inclined at 45° on each side of the reference plane Z—Z, allowing therebetween an emptying opening equipped with the two devices 46. This arrangement is therefore only applicable to products which flow easily.

Without departing from the scope of the invention, the shape of the hopper may be different, the method permitting obtaining an angle of rotation of the silo which exceeds 45°. For example, if the product required that the planes of the hopper be inclined at 70° to the horizontal, it will be possible to give to the dihedral an angle of 40° and the pivot the silo through 70°.

1. A system for transporting, erecting, and selectively retrievably lowering and reloading elongated storage container apparatus, such as a silo/tank assembly having top and bottom end portions, for deposit in a generally upright, but inclined off vertical, operative manner upon a generally horizontal support surface; said system comprising in combination:

a. a wheeled vehicle having an elongated load-carrying chassis with rearwardly disposed bearings means and adaptable to pivotally support the transport said container apparatus in a generally horizontal manner;

b. extendable and retractable telescopic cylinder and piston type handling arm means pivotally mounted on a forward end of said vehicle chassis, and including an extensible free end adaptable for detachable engagement with said container apparatus near its top end portion during selective pivotal erecting and lowering movement about said bearing means, the latter of which include complemental bearing portions on said bottom end portion of said container; and c. the elongated storage container apparatus comprising:
   1. an elongated volumetric storage container having means near the bottom end thereof for emptying the same when in a generally vertical operative condition;
   2. first support means including a pair of elongated arms means connected pivotally at one end of said arm means near the top end portion of said container apparatus and on a side of said container which is closely adjacent said vehicle chassis when in the transporting condition, with said arm means terminating in a pair of other free ends; said arm means adaptable to move during container erection to an extended position wherein said free ends of the arm means swing a substantial distance away to engage said support surface, and, during lowering of said container, move to a retracted position relatively close to said container for transporting thereof; and
   3. second support means including a framework mounted on and having free ends extended from the bottom end portion of said storage container, when erected, with the bottom end portion elevated a substantial distance above said support surface; and d. said first and second support means of said container being of different relative lengths such that said container when in the erected operative condition is in a pronounced inclined off vertical condition.

2. The system of claim 1, further including tie-link means releasably and pivotally interconnecting said free ends of said container's second support means and a rearward portion of said vehicle chassis to stabilize and preclude undesired movement of said container away from said vehicle chassis during unloading and erecting thereof, said tie-links adapted to be disconnected from said container after container erection.

3. The system of claim 1, wherein said pair of elongated arm means are a pair of laterally spaced main support arms, each further having at its end pivotally connected near the top portion of said container apparatus an attached angular auxiliary bracing strut extending toward the other but connected separately and pivotally to a medical portion of a side of the storage container apparatus.

4. The system of claim 3, wherein said main support arms are divergingly disposed, and each arm includes universal type connecting means for effecting the pivotal connection thereof to the container, and each auxiliary bracing strut has a pivotal connection means to said container apparatus, and said respective universal and pivotal connection means of each arm means is such as to form a common pivotal axis X—X thereof which is inclined with respect to a longitudinal axis of said container, and each of said pivotal axis X—X of said arm means collectively forming a V-shape pointed toward the top end of said container.

5. The system of claim 4, wherein said universal type connecting means is of the ball joint type, and with the ball of the joint attached to said arm and in bearing engagement with a spherical cup integrally formed on said container apparatus.

6. The system of claim 5, wherein each of said auxiliary bracing strut's pivotal connection with said container apparatus includes a vertically slotted bracket on said container apparatus, which slot is sized to receive and retain without lateral play a pivotal pin on the related end of said strut and maintains said pivot pin in a vertical plane of the slot when said container apparatus is in the erected operative position.

7. The system of claim 6, further including detachable stabilizing and support shoes with means interconnecting same; said shoes adapted to detachably receive in upwardly open cavity portions thereof the respective free ends of said main support arms; said shoe interconnecting means capable of working under tension and being of predetermined length which is greater than the width of said container apparatus in the area of the connection of said main support arms therewith so as to preclude exceeding a predetermined divergence of said main support arms and shoes, and said main support arms, auxiliary struts, and said shoe-connecting means are relatively disposed when in the erected condition that pivot pins on said auxiliary bracing struts are disposed substantially in the middle of said vertical slots.

8. The system of claim 3, further including detachable support shoes adapted to detachably receive in upwardly open cavity portions thereof the respective free ends of said main support arms, said support shoes adapted for direct engagement with a support surface.

9. The system of claim 8, wherein said shoes include at least a partial general funnel-shape guide in conjunction with the upwardly open cavity portions.

10. The system of claim 8, wherein said main support arms are disposed so as to diverge apart at their free ends, and said system further including shoe-connecting means capable of working under tension and which shoe-connecting means has a predetermined length greater than the width of said container apparatus in the area of the connection of said main support arms so as to preclude exceeding of a predetermined divergence of said main support arms on the supporting surface.

11. The system of claim 3, wherein said second support means further include wide support shoes with means pivotally connecting them on a horizontal axis on the free ends of said framework for engagement upon the support surface; and said first and second support means being relatively disposed to provide an inertia of torsion between the various support members thereof so as to allow for equal distribution of weight between the respective support shoes of each means.

12. The system of claim 11, wherein said wide support shoes have means mounting them for rotation about a generally vertical axis such that they can provide increased lateral stability in the operative condition, and can be retracted so as to narrow the lateral width of said shoes not to exceed that of the framework when in the transporting condition.

13. The system of claim 12, wherein said framework and wide support shoes thereof have means for mounting the same so as to permit said shoes to pivot freely about the horizontal axis when in an outwardly rotated position providing the increased lateral stability, but is such as to preclude shoe movement when the storage container apparatus is in the transport position.

14. The system of claim 1, further including a pocket-like receptacle and means mounting it above the top end of said container, said receptacle having outwardly tapering walls and disposed to guidingly receive and support the extensible free end of said handling arm means carried by said vehicle chassis.

15. The system of claim 1, further including cooperatively interengageable means respectively on said container at a bottom central portion thereof and correspondingly on said vehicle chassis at a rearward portion for facilitating effective centering and proper orientation of said container relative to said chassis during preparation for transporting same 16. The system of claim 1, wherein the bearing means include at least one transversely extending and upwardly open partially cylindrical bearing member on a rearward part of said vehicle chassis, and a complemental essentially cylindrical surfaced bearing member disposed on a correspondingly rearward or bottom part of said volumetric container and pivotally mountable in said upwardly open bearing member.

17. The system of claim 16, including a movable lock device with means for selectively locking and unlocking the bearing members in assembled association.

18. The system of claim 17, wherein said lock device includes a retaining hook with biasing means biasing it to locked position, and the means for selectively unlocking it include control level and cable means operatively connected with said retaining hook to move it to an unlocked position.

19. The system of claim 16, wherein the upwardly open bearing member includes means defining an upwardly and rearwardly facing inclined slotway for guidingly receiving said cylindrical surfaced bearing member therein.

20. The system of claim 1, wherein said storage container and said vehicle chassis have respectively interengageable and selectively lockable retaining means at respectively top and forward-end portions to help longitudinally orient and retain said storage container on said vehicle chassis when in the transporting condition.

21. The system of claim 1, further comprising on said vehicle chassis at rearward, laterally opposite sides two separate pairs of auxiliary aligned horizontally disposed support members, a first pair being fixed on said chassis and said free ends of said arms of said first support means of paragraph (c) (2) carried thereon when said storage container is in the horizontal transport position; and a second pair of the said support members disposed somewhat rearwardly and lower than said first fixed pair, said second pair being laterally extensible and retractable in character and adaptable to be extended for predeterminable support of the respective free ends of said first support arms in the course of operations attendant the loading and unloading of said storage container.

22. In a system for horizontally transporting, erecting and selectively retrievably lowering and reloading large elongated storage container apparatus, such as a silo/-tank assembly having top and bottom end portions for deposit in a ready-to-use generally upright, but inclined off vertical operative condition upon a generally horizontal support surface, which system embodies an elongated vehicle chassis for transporting an elongated volumetric container in the generally horizontal position; the chassis having fluid-pressure-operated extensible and retractable handling arm means having one end pivotally mounted on a forward part of said chassis, and a free end operatively, releasably engageable with an end portion which is a top portion of said container when in the erected condition to effect pivotal elevating and lowering of said container about pivotal bearing means having a horizontal bearing axis which is perpendicular to a direction of transporting travel; the container and chassis having cooperatively interengageable bearing means at adjacent portions near the rearward end when in the horizontal transporting condition, and about which bearing means the container is pivotally elevated and lowered; the improvement comprising:
 a. first support means including a pair of elongated arm means connected pivotally at one end thereof near the top end of said container and on a side of said container closely adjacent said chassis when in the lowered horizontal transporting position; said arm means having a pair of free ends adaptable to swing from a closely retracted position to an extended position away from said container when being erected and to help support said container when erected;
 b. second support means for said container including a relatively stationary framework mounted on and having a pair of free ends extended from the bottom end of said container and adaptable to engage the support surface to help support said container when erected with the bottom end elevated a substantial distance above said support surface; and
 c. said first and second support means of said container being of different relative lengths such that said container, when in the erected operative condition, is in a noticeably inclined off-vertical condition.

23. The system of claim 22, further including tie-link means releasably and pivotally interconnecting said free ends of said container's second support means framework with a rearward portion of said vehicle chassis to stabilize and preclude undesired movement of said container away from said chassis during both loading and unloading erecting thereof, with said tie-means adapted to be disconnected from said container after erection thereof.

24. The system of claim 22, wherein said first support arm means comprise two laterally spaced elongated main support arms each having at its end connected to said container apparatus an attached angular auxiliary bracing strut extending toward the other but connected separately and pivotally to a medial portion of a side of the storage container apparatus.

25. The system of claim 24, wherein said main support arms are divergingly disposed, and each arm includes universal type connecting means for effecting the pivotal connection thereof to the container, and each auxiliary bracing strut has a pivotal connection means to said container apparatus, and said respective universal and pivotal connection means of each arm means is such as to form a common pivotal axis X—X thereof which is inclined with respect to a longitudinal axis of said container, and each of said pivotal axis X—X of said arm means collectively forming a V-shape pointed toward the top end of said container.

26. The system of claim 25, wherein said universal type connecting means is of the ball joint type, and with the ball of the joint attached to said arm and in bearing engagement with a spherical cup integrally formed on said container apparatus.

27. The system of claim 26, wherein each of said auxiliary bracing strut's pivotal connection with said container apparatus includes a vertically slotted bracket on said container apparatus, which slot is sized to receive and retain without lateral play a pivotal pin on the related end of said strut and maintains said pivot pin in a vertical plane of the slot when said container apparatus is in the erected operative position.

28. The system of claim 27, further including detachable stabilizing and support shoes with means interconnecting same; said shoes adapted to detachably receive in upwardly open cavity portions thereof the respective free ends of said main support arms; said shoe interconnecting means capable of working under tension and being of predetermined length which is greater than the width of said container apparatus in the area of the connection of said main support arms therewith so as to preclude exceeding a predetermined divergence of said main support arms and shoes, and said main support arms, auxiliary struts, and said shoe-connecting means are relatively disposed when in the erected condition that pivot pins on said auxiliary bracing struts are disposed substantially in the middle of said vertical slots.

29. The system of claim 24, further including detachable support shoes adapted to detachably receive in upwardly open cavity portions thereof the respective free ends of said main support arms, said support shoes adapted for direct engagement with a support surface.

30. The system of claim 29, wherein said shoes include at least a partial general funnel-shape guide in conjunction with the upwardly open cavity portions.

31. The system of claim 29, wherein said main support arms are disposed so as to diverge apart at their free ends, and said system further including shoe-connecting means capable of working under tension and which shoe-connecting means has a predetermined length greater than the width of said container apparatus in the area of the connection of said main support arms so as to preclude exceeding of a predetermined divergence of said main support arms on the supporting surface.

32. The system of claim 24, wherein said second support means further include wide support shoes with means pivotally connecting them on a horizontally axis on the free ends of said framework for engagement upon the support surface; and said first and second support means being relatively disposed to provide an inertia of torsion between the various support members thereof so as to allow for equal distribution of weight between the respective support shoes of each support means.

33. The system of claim 32, wherein said wide support shoes have means mounting them for rotation about a generally vertical axis such that they can provide increased lateral stability in the operative condition, and can be retracted so as to narrow the lateral width of said shoes not to exceed that of the framework when in the transporting condition.

34. The system of claim 33, wherein said framework and wide support shoes thereof have means for mounting the same so as to permit said shoes to pivot freely about the horizontal axis when in an outwardly rotated position providing the increased lateral stability, but is such as to preclude shoe movement when the storage container apparatus is in the transport position.

35. The system of claim 22, further including a pocket-like receptacle and means mounting it above the top end of said container, said receptacle having outwardly tapering walls and disposed to guidingly receive and support the extensible free end of said handling arm means carried by said vehicle chassis.

36. The system of claim 22, further including cooperatively interengageable means respectively on said container at a bottom central portion thereof and correspondingly on said vehicle chassis at a rearward portion for facilitating effective centering and proper orientation of said container relative to said chassis during preparation for transporting same.

37. The system of claim 22, wherein the bearing means include at least one transversely extending and upwardly open partially cylindrical bearing member on a rearward part of said vehicle chassis, and a complemental essentially cylindrical surfaced bearing member disposed on a correspondingly rearward or bottom part of said volumetric container and pivotally mountable in said upwardly open bearing member.

38. The system of claim 37, including a movable lock device with means for selectively locking and unlocking the bearing members in assembled association.

39. The system of claim 38, wherein said lock device includes a retaining hook with biasing means biasing it to locked position, and the means for selectively unlocking it include control level and cable means operatively connected with said retaining hook to move it to an unlocked position.

40. The system of claim 37, wherein the upwardly open bearing member includes means defining an upwardly and rearwardly facing inclined slotway for guidingly receiving said cylindrical surfaced bearing member therein.

41. The system of claim 22, wherein said storage container and said vehicle chassis have respectively interengageable and selectively lockable retaining means at respectively top and forward-end portions to help longitudinally orient and retain said storage container on said vehicle chassis when in the transporting condition.

42. The system of claim 22, further comprising on said vehicle chassis at rearward, laterally opposite sides two separate pairs of auxiliary aligned horizontally disposed support members, a first pair being fixed on said chassis and said free ends of said arms of said first support means of paragraph (a) carried thereon when said storage container is in the horizontal transport position; and a second pair of the said support members disposed somewhat rearwardly and lower than said first fixed pair, said second pair being laterally extensible and retractable in character and adaptable to be extended for predeterminable support of the respective free ends of said first support arms in the course of operations attendant the loading and unloading of said storage container.

43. The system of claim 22, wherein said vehicle chassis includes discharge guide means at a rearward end for directing the contents of said storage container clear of said chassis when desired when in the transporting position.

44. The system of claim 22, wherein said vehicle chassis includes discharge guide means at a rearward end for directing the contents of said storage container clear of said chassis when desired when in the transporting position.

45. In a method for loading a storage container apparatus such as a silo-tank assembly upon a wheeled vehicle having pivotable and selectively extensible and retractable handling arm means disposed adjacent a forward end of the vehicle, the storage container apparatus comprising an elongated container which is adapted to be supported on a generally horizontal support surface in a stabilized generally upright but inclined off-vertical operative position by first support means including two support arm means pivotably connected at their ends to the container near an upper end of the container, and the arms having free ends adaptable for engaging said support surface, and also to be supported by second support means which are mounted at a lower end of the container and which have free ends adaptable for engaging said support surface; the steps comprising:

1. placing the vehicle in a position in which it extends between said support arm means of said first support means, including placing a rearward end of said vehicle in an intermediate position between said free ends of said support arm means and said free ends of said second support means;
2. extending said handling arm means to engage and support an upper part of said storage container apparatus;
3. pivoting said support arm means out of engagement with said support surface in a direction toward said container while supporting the storage container apparatus by said handling arm means;
4. retracting said handling arm means and thereby allowing said storage container apparatus to tilt about said free ends of said second support means under the effect of the force of gravity to an intermediate position of engagement of a predetermined lower part of said storage container apparatus with a corresponding predetermined placed bearing means on the vehicle;
5. continuing to retract said handling arm means and thereby allowing said storage container apparatus to tilt about said bearing means under the effect of the force of gravity and thereby raising said free ends of said second support means off said support surface until said container bears on and is supported by said vehicle in a generally horizontal transport position; and
6. pivoting said support arm means reltaive to said container to a position substantially alongside said container while in the course of said tilting of said storage container apparatus.

46. The method of claim 45, further comprising the step of pivotally linking the vehicle to said free ends of said second support means before allowing said storage container apparatus to tilt about said free ends of said second support means, to thereby preclude sliding movement of said container and its attached second support means away from said vehicle.

47. In a method for unloading a storage container apparatus such as a silo-tank assembly to an erected operative position from a wheeled vehicle having a pivotable and selectively extensible and retarctable handling arm means disposed adjacent a forward end of the vehicle, the storage container apparatus comprising an elongated container which has a generally horizontal transport position in bearing relation to the vehicle and includes first support means having two support arm means pivotably connected at their ends to the container near a front end of the container on the vehicle, and further includes second support means which are mounted at a rear end of the container; the method steps comprising:

1. extending said handling arm means while maintaining a free end of same in engagement with a front end part of the storage container apparatus and thereby commencing upwardly tilting of the storage container apparatus about bearing means located on the vehicle adjacent a rearward part of the storage container apparatus until free ends of said second support means come in contact with a generally horizontally support surface;
2. continuing to extend said handling arm means and thereby further upwardly tilting said storage container assembly about said free ends of second support means in contact with said support surface until said container reaches a generally upright but inclined off-vertical operative position;
3. pivoting said two support arm means of said first support means relative to said container until free ends of said support arm means come in contact with said support surface and stabilize said container in said operative position thereof; and
4. thereafter retracting said handling arm means to enable the vehicle to move away from said storage container assembly.

48. The method of claim 47, further comprising the steps of initially detachably linking said vehicle to said free ends of said second support means before extending said handling arm means to preclude sliding movement of said container and the attached second support means away from said vehicle; and ultimately unlinking the vehicle from said free ends of said second support means after completing the erected unloading of said container in a stabilized operative position thereof.

* * * * *